United States Patent Office 3,307,436
Patented Mar. 7, 1967

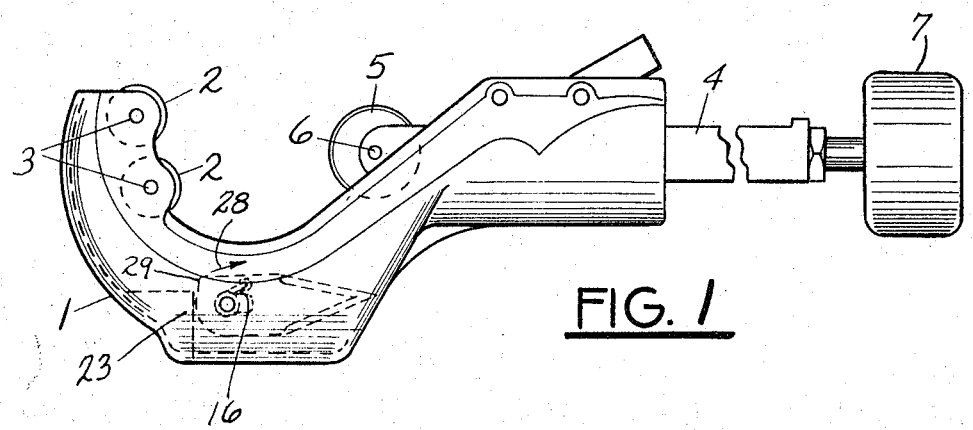
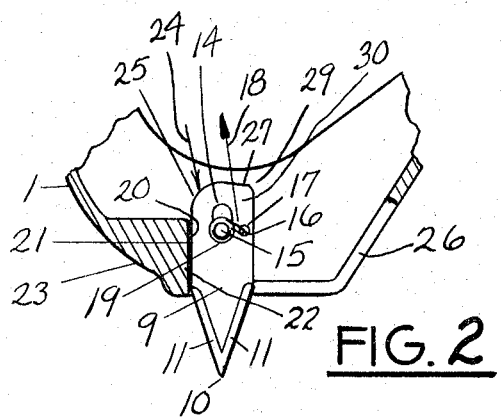
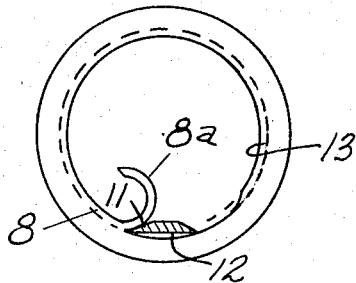
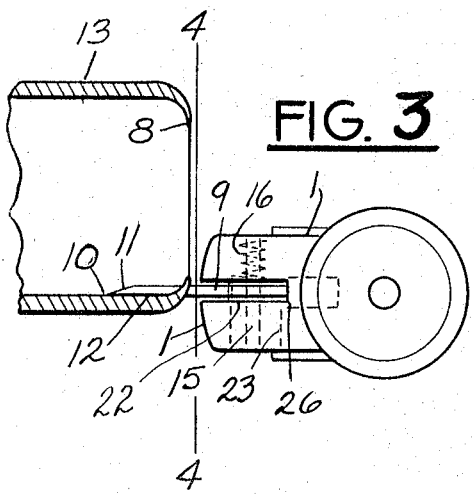

3,307,436
DEBURRING TOOL
Axel V. Jonasson and Bengt G. Bjalme, Erie, Pa., assignors to Reed Manufacturing Company, Erie, Pa., a corporation of Pennsylvania
Filed Sept. 18, 1964, Ser. No. 397,452
5 Claims. (Cl. 77—73)

This invention is a deburring tool for soft metal pipe having a retractable, rigid blade which peels the burr from the inner surface of the pipe. When not in use, the blade is sheathed within the frame of the cutter.

In the drawing, FIG. 1 is a side elevation of a pipe cutter, partly broken away, with the deburring tool in the retracted position, FIG. 2 is a fragmentary view showing the deburring tool in the operating position, FIG. 3 is a view illustrating the use of the tool, and FIG. 4 is a section on line 4—4 of FIG. 3.

The tool is shown applied to a cutter of the type described in greater detail in Patent 3,100,934. As there shown, the cutter has a C-shaped frame 1 of channel cross section having at one end rolls 2 journaled on pins 3 and having at the other end a slide 4 carrying a cutting wheel 5 journaled on a pin 6. In use, the pipe is cradled on the rollers 2 and the cutting wheel 5 is advanced against the pipe by a pressure screw 7, which develops the desired cutting pressure. In this type of cutter, the cutting operation results in an inwardly extending burr 8 at the cut which should be removed before the pipe is connected in service. Heretofore, the burr has been removed by a reamer.

In this tool, the burr is removed by a rigid knife blade 9 retractably mounted in the cutter frame. The blade has a pointed end 10 with cutting edges 11 beveled at an acute positive rake angle. In the operating position shown in FIGS. 3 and 4 the flat surface 12 of the blade rests chordwise against a small arc of the inner surface of the pipe 13 of soft metal such as copper and by relative rotation between the blade and the pipe while maintaining the flat surface 12 in contact with the inner surface of the pipe the burr 8 is quickly cut or peeled off in a single chip 8a. This provides the desired smooth inner surface of the pipe. The blade 9 being of hardened steel easily cuts through the soft metal burr 8. The pointed end 10 lies flat against the inner surface of the pipe 13 for all of the pipe sizes to be cut. Both sides of the point have cutting edges so that the blade will cut in either direction.

Since the cutting blade is used only for removal of burrs, it is preferably sheathed when not in use. This is accomplished by providing the blade with an elongated slot 14 through which extends a pin 15 fixed in and extending across the sides of the channel of the cutter frame. A coil spring 16 surrounding the pin has one end connected at 17 to the blade and exerting a force on the blade in the direction of arrow 18. This tends to hold the lower end 19 of the slot 14 against the pin 15 and to hold a flat surface 20 on the blade against a corresponding flat surface or abutment 21 on the frame. This provides a rigid support for the blade since the engagement of the surfaces 20 and 21 prevents rotation of the blade around the pin 15. Any cutting thrust on either cutting edge 11 of the blade is in the direction to supplement the force exerted by the spring 16 and to hold the blade tightly against the pin 15 and against the flat surface 21. The coil spring 16 also exerts a force against the blade holding it against the flat surface 22 on a boss 23 on the cutter frame.

To retract the blade 9 it is merely necessary to push on the inner end of the blade in the general direction of arrow 24. This moves the upper end of the slot 14 against the pin 15 and brings the arcuate surface 25 on the blade adjacent surface 21 on the cutter frame. The coil spring 16 now rotates the blade 9 about the pin 15, moving it through slot 26 in the bottom and extending lengthwise of the channel section of the cutter frame to the position shown in FIG. 1 where flat surface 27 abuts the surface 21 on the frame.

The blade can be returned to the operating position by applying the force in the direction of arrow 28 to the corner 29 of the cutter, thereby rotating the blade in a clockwise direction as viewed in FIG. 1 and bringing it to the FIG. 2 position. When the blade reaches the FIG. 2 position, the spring moves the blade to the FIG. 2 position but if for any reason the blade should stick, it can be manually assisted to the FIG. 2 position.

Both the extension and retraction of the cutting blade can conveniently be carried out by finger or thumb pressure exerted on the blunt inner end 30 of the blade. With practice, this can be done with one hand in a single, uninterrupted motion.

What is claimed as new is:

1. A deburring tool for pipe cutter having a C-shaped frame of channel section with a slot in the bottom and extending lengthwise of the channel, a pin extending across the sides of the channel, a rigid blade rotatable on the pin from a sheathed position between the sides of the channel to an operating position projecting through the slot in the bottom of the channel, a longitudinal slot in the blade slidable on the pin, and an abutment on the channel cooperating with the blade to block rotation of the blade when the blade in its extended positon is pushed inward relative to the bottom of the channel.

2. The deburring tool of claim 1 having a coil spring surrounding the pin and connected between the frame and blade and exerting a force on the blade in the direction to move the blade inward and to rotate the blade toward the sheathed position.

3. A deburring tool for pipe cutter having a C-shaped frame of channel section with a slot in the bottom and extending lengthwise of the channel, a pin extending across the sides of the channel, a blade rotatable on the pin from a sheathed position between the sides of the channel to an operating position having a portion projecting through the slot in the bottom of the channel, the projecting portion of said blade being rigid and having one face shaped to lie chordwise against a small arc of the inner surface of the pipe and with a beveled edge diverging from said one face at a positive rake angle, a longitudinal slot in the blade slidable on the pin, and an abutment on the channel cooperating with the blade to block rotation of the blade when the blade in its extended position is pushed inward relative to the bottom of the channel.

4. A deburring tool for a wheel type pipe cutter comprising a rigid blade having a point of wedge shape with one face shaped to lie chordwise against a small arc of the inner surface of the pipe with the point flat against the inner surface of the pipe and with a beveled edge diverging from said one face at an acute positive rake angle, 5. A deburring tool for a wheel type pipe cutter comprising a rigid blade with one face shaped to lie chordwise against a small arc of the inner surface of the pipe and with a beveled edge diverging from said one face at an acute positive rake angle.

References Cited by the Examiner

UNITED STATES PATENTS

| | | | |
|---|---|---|---|
| 2,582,406 | 1/1952 | Bachli et al. | 30—102 |
| 2,630,028 | 3/1953 | McIntosh | 77—73 |
| 2,871,733 | 2/1959 | Lauck | 77—73 |
| 3,022,575 | 2/1962 | Wright | 30—102 |

FOREIGN PATENTS 310,291  12/1955  Switzerland

FRANCIS S. HUSAR, *Primary Examiner.*